March 7, 1950     C. SKLAREK     2,499,611
ADJUSTABLE LIGHT MOUNTING

Filed Oct. 29, 1947     2 Sheets-Sheet 1

Inventor
CLIFFORD SKLAREK.
By Joseph Harris
Attorney

March 7, 1950     C. SKLAREK     2,499,611
ADJUSTABLE LIGHT MOUNTING
Filed Oct. 29, 1947     2 Sheets-Sheet 2
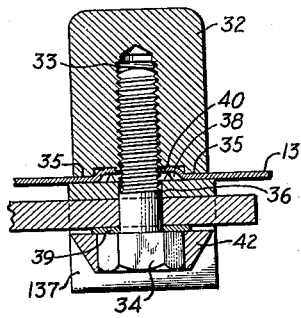
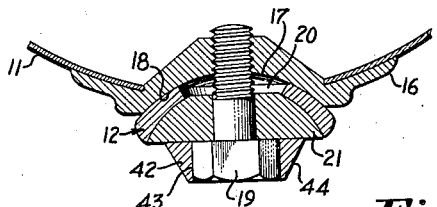
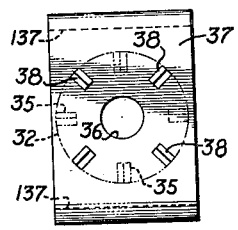
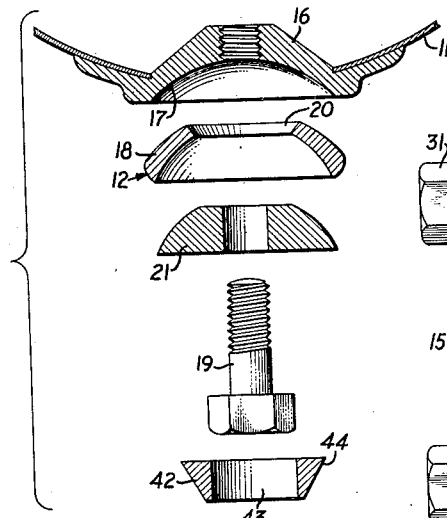
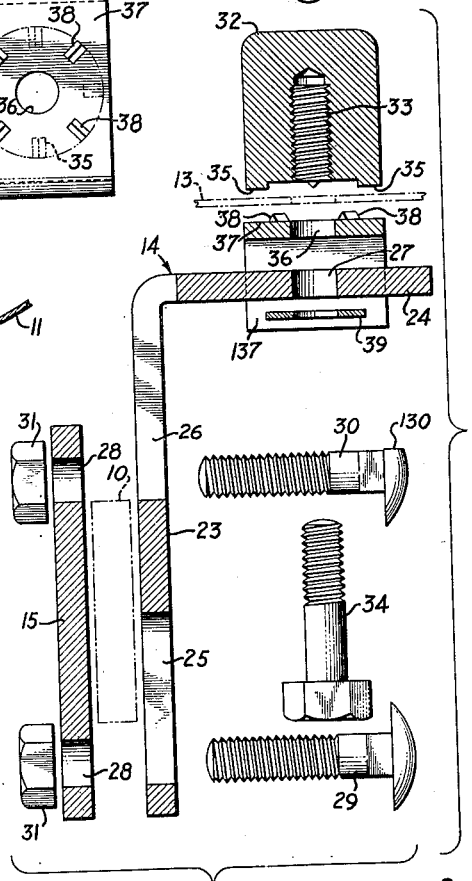
Inventor
CLIFFORD SKLAREK.
By Joseph Harris
Attorney Patented Mar. 7, 1950

2,499,611

UNITED STATES PATENT OFFICE 2,499,611

ADJUSTABLE LIGHT MOUNTING

Clifford Sklarek, Los Angeles, Calif.

Application October 29, 1947, Serial No. 782,808

2 Claims. (Cl. 248—226)

This invention relates to improvements in fog light mountings and, more specifically, such mountings for automotive vehicles having bumper constructions wherein light gage dust or gravel pans are used between the bumper bar and radiator grill to conceal the bumper supports.

The modern passenger automobile is now practically universally provided with a front bumper bar and a dust or gravel pan of light gage metal overlying the usual supports for the bumper bar. This general construction, which varies greatly in details of arrangements of the different makes of cars, presents considerable difficulty in the mounting of fog-lights because the metal pan is not sufficiently heavy to act as a support, and it is therefore necessary to pass through the pan to the bumper bar supports for the proper attachment of the fog lights. One especially variable encountered, is in the spacing between such pans and the bumper bar supports and the angular direction of said supports.

One object of the invention, therefore, is to provide a mounting for fog lights for automotive vehicles of the type referred to, which mounting is universally adaptable to the wide variations in spacing of pan and bumper bar supports; to varying angular positions and dimensions of such supports and which does not mar the appearance of the pan.

Another object of the invention is to provide a mounting of the character indicated in the preceding paragraph which consists of a minimum number of parts of simple construction easily and relatively cheaply manufactured.

A further object of the invention is to provide simple, inexpensive means to minimize theft or unauthorized removal of the fog-light.

Other objects of the invention will more clearly appear from the following description taken in connection with the accompanying drawings and set forth in the claims.

Figure 1:
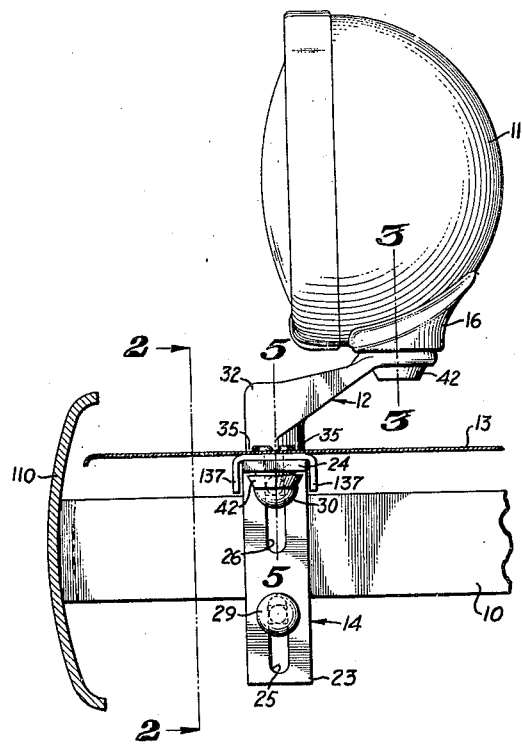
Figure 2:
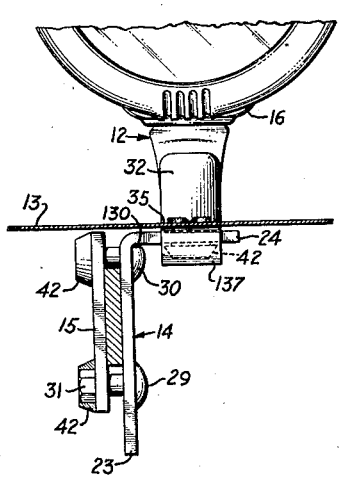

In said drawings, Fig. 1 is a longitudinal, vertical section of an automobile bumper construction showing the improved mounting, the fog light proper being shown in side elevation. Fig. 2 is a vertical section corresponding to the section line 2—2 of Fig. 1 and looking in the direction of the arrows. Fig. 3 is an enlarged vertical sectional view corresponding to the line 3—3 of Fig. 1. Fig. 4 is an exploded view of the parts of Fig. 3. Fig. 5 is an enlarged vertical sectional view corresponding to line 5—5 of Fig. 1. Fig. 6 is an exploded view of the parts shown in Fig. 5, together with associated parts shown in Fig. 2. And Fig. 7 is a top plan of a clamping washer.

In said drawings, 10 indicates a portion of a bumper bar support to which is secured the bumper bar proper 110. The fog light shell is indicated at 11, the bracket arm at 12, a portion of the dust or gravel pan at 13, a supporting arm at 14 and a clamping plate at 15.

To provide for universal adjustment of the light shell 11 relative to the bracket arm 12, the light shell has secured thereto a saddle 16 having a concave spherical surface 17 with which cooperates a convex spherical surface 18 on the bracket arm, as best shown in Figs. 3 and 4. The saddle is threaded to receive the threaded end of a bolt 19 which passes through an enlarged opening 20 in the bracket arm. Interposed between the head of the bolt 19 and spherical portion of the bracket arm is a disc-like washer 21 as clearly shown. With the construction described, it is evident that the shell 11 may be universally adjusted within the limits of the opening 20 and then clamped in adjusted position by tightening up the bolt 19.

Referring now to the means for securing the fog light to the bumper bar support 10. The supporting arm 14 is preferably in the form of a relatively heavy bent plate having an elongated vertical section 23 and a horizontal shorter section 24, said shorter section 24 extending to one side of the bumper bar support to allow for minimum spacing between the bumper bar support and pan. The section 23 is provided with two, vertically spaced, alined, elongated vertically extending slots 25 and 26 and the section 24 with an aperture 27 for passage of a bolt. The clamp plate 15 is also of relatively heavy form and provided with vertically spaced, bolt openings 28—28. The distance between said openings 28 will be made somewhat greater than the maximum width of bumper bar support 10 that is encountered on any of the bumper constructions in use and to which it is customary to apply fog lights. Cooperable with the supporting arm 14 and clamp plate 15 are two carriage bolts 29 and 30, the latter having one side of its head sheared off, as indicated at 130, to permit its use in the maximum lowered position of the supporting arm 14 against the section 24, as illustrated in Fig. 2. Cooperable with said bolts are nuts 31—31.

With the construction just described, it will be seen that the supporting arm 14 can be clamped to the bumper bar support 10 in any vertical position within the limits of the lengths of the slots 25 and 26, thus adapting the one mounting to all the variations of vertical spacing between pans and bumper bar supports occurring in actual practice, it being understood that the slots 25 and 26 will be made of such length to provide for such minimum and maximum variations. Such minimum and maximum variations are indicated in Figs. 2 and 6, respectively. Thus, by the described spacing of the bolt holes 28—28 in the clamp plate 15 and the length of the slots 25—26 in the supporting arm 14, the attachment to the bumper bar support 10 can be adjusted simply regardless of any combination of variations in width and thickness of bar support 10 and spacing between pan 13 and bar support 10 encountered in any car.

To secure the bracket arm 12 to the supporting arm 14, the construction as best shown in Figs. 5, 6, and 7, is preferably employed. The lower end of the bracket arm 12 is formed with a hub 32 having a threaded opening 33 to cooperate with a bolt 34. The bottom face of the hub 32 is shown provided with a plurality of circularly spaced, relatively shallow lugs 35. Interposed between the supporting arm section 24 and the pan 13 is a clamping washer having a horizontal section 37 with a central opening 36 and downturned flanges 137—137 at its ends straddling the section 24 and thereby preventing turning of the washer relative to the supporting arm 14. The upper face of section 37 is provided with a plurality of circularly spaced, relatively shallow lugs 38 similar to the lugs 35. A lock washer 39 is preferably employed between the head of bolt 34 and the arm section 24, as shown.

As will be evident, the only operation necessary to adapt the pan 13 for attachment of the fog light, is the drilling of a single opening 40 for reception of the bolt 34. With the parts just described and assembled as shown best in Fig. 5, it is evident that, as the bolt 34 is tightened up, the lugs 35 and 38 on the opposite sides of the pan sheet will gradually indent the sheet, which is always of relatively light gage, thereby securing the hub 32 and clamping washer 37 in such relatively angularly adjusted position as previously determined to locate the fog light in the desired position. The down turned flanges 137 of the clamp plate obviously prevent turning on the supporting arm 14.

With the angular adjustment provided between the bracket arm 12 and supporting arm 14 just described, it will be apparent that the mounting means for the light is also adapted for all such variations in angular direction of the bumper bar support 10 as may be encountered, whereby the one set of mounting means is universally adapted for use under all the variable conditions occurring in practical use with regard to widths and thicknesses of bumper bar supports, angular direction thereof, and spacing between pans and bumper bar supports. Furthermore, it will be seen that the means for attaching the fog light to the bumper bar support 10 are of the utmost simplicity and involve a minimum of cost since the two members 14 and 15 consist of plate material with simple punched openings and slots and with only one simple bending operation for the member 14. No threaded openings are required and the securing bolts obviously may be of standard form with a slight shearing operation on the head of the bolt 30.

As will be apparent, the attachment of bracket arm to the supporting arm 14 prevents twisting or turning of the bracket arm so long as the bolt 34 is tight. As an additional anti-theft provision, each of the bolts 19 and 34 and nuts 31, is provided with an anti-theft cap 42, best shown in detail in Figs. 3 and 4. Each said cap is in the form of a disc of a thickness slightly greater than the thickness of the bolt head or nut to which applied. It is centrally apertured at 43 to correspond with the size and shape of the bolt head and/or nut but with a slight taper so as to provide a driving wedge fit when hammered over the nuts and bolt heads. On its outer face, the cap is formed with a conical surface 44. When the caps 42 are driven home, it is obvious that the same cannot be removed with any ordinary type of wrench or other tool, thus minimizing unauthorized removal of the light.

Although there has herein been shown and described what is now considered the preferred embodiment of the invention, the same is merely illustrative. All changes and modifications are contemplated that come within the scope of the appended claims.

What is claimed is:

1. A universal mounting for a light to variable bumper constructions employing a bumper bar support and a sheet metal pan overlying the support, said mounting comprising: a light-bracket arm disposable on and having the lower portion thereof directly engageable with the upper side of the pan; a supporting arm disposable beneath the pan, said arm being formed of a bent plate having a vertical section and a horizontal section, the horizontal section being extended to one side of the bumper bar support positioned beneath the pan in alinement with said lower portion of the bracket arm, said vertical section of the supporting arm being provided with a pair of vertically spaced and alined, elongated slots; a washer disposable between said horizontal section of the supporting arm and pan, said washer having downturned flanges straddling said horizontal section, said washer and light-bracket arm having cooperable opposed projections adapted to indent the pan and thereby prevent turning of the light-bracket arm relative to the pan and supporting arm when drawn together; means for clamping said light-bracket arm, washer and horizontal section together; a clamp plate having a pair of vertically spaced bolt receiving openings alinable with said slots, said plate and vertical section of the supporting arm being disposable on opposite sides of the bumper bar support; securing bolts extending through said slots and openings and adapted to secure the plate and supporting arm to bumper bar supports of variable thicknesses; the spacing of said plate openings and the lengths of said supporting arm slots being, respectively, such that the bolts will straddle the maximum width bumper bar support and said supporting arm is vertically adjustable for variable spacing between pans and bumper bar supports while maintaining said light-bracket arm in engagement with the pan.

2. A universal mounting for a light to variable bumper constructions employing a bumper bar support and a sheet metal pan overlying the support, said mounting comprising: a light-bracket arm disposable on and having the lower portion thereof directly engageable with the upper side of the pan; a supporting arm disposable beneath the pan, said arm being formed of a bent plate having a vertical section and a horizontal section, the horizontal section being extended to one side of the bumper bar support and positionable beneath the pan in alinement with said lower portion of the bracket arm, said vertical section of the supporting arm being provided with a pair of vertically spaced and alined, elongated slots; means for clamping said light-bracket arm and horizontal section together; a clamp plate having a pair of vertically spaced bolt-receiving openings alinable with said slots, said plate and vertical section of the supporting arm being disposable on opposite sides of the bumper bar support; securing bolts extending through said slots and openings and adapted to secure the plate and supporting arm to bumper bar supports of variable thicknesses; the spacing of said plate openings and the lengths of said supporting arm slots being, respectively, such that the bolts will straddle the maximum width bumper bar support and said supporting arm is vertically adjustable for variable spacing between pans and bumper bar supports while maintaining said light-bracket arm clamped with the pan.

CLIFFORD SKLAREK.

REFERENCES CITED

The following references are of record in the file of this patent:

UNITED STATES PATENTS

| Number | Name | Date |
| --- | --- | --- |
| 1,595,419 | Woller | Aug. 10, 1926 |
| 2,123,125 | Trippe | July 5, 1938 |
| 2,344,683 | Dow et al. | Mar. 21, 1944 |